United States Patent [19]

Sträter et al.

[11] Patent Number: 5,033,707
[45] Date of Patent: Jul. 23, 1991

[54] HOLDER FOR OFFICE EQUIPMENT

[76] Inventors: Fritz Sträter; Uwe Sträter, both of Unterm Bamberg 1, D-5882 Meinerzhagen, Fed. Rep. of Germany

[21] Appl. No.: 525,097

[22] Filed: May 17, 1990

[30] Foreign Application Priority Data

Jun. 3, 1989 [IT] Italy .................................. 3918179

[51] Int. Cl.⁵ ........................................... F16M 11/00
[52] U.S. Cl. ............................. 248/284; 248/281.1; 248/918
[58] Field of Search ............ 248/284, 585, 293, 281.1, 248/121, 918; 74/94

[56] References Cited

U.S. PATENT DOCUMENTS

| | | | |
|---|---|---|---|
| 806,708 | 12/1905 | Perry | 74/98 X |
| 2,301,661 | 11/1942 | Wredenhoeft | 248/284 X |
| 4,691,888 | 9/1987 | Coffenll | 248/919 X |
| 4,892,278 | 1/1990 | Huang | 248/284 X |

FOREIGN PATENT DOCUMENTS

| | | |
|---|---|---|
| 2717290 | 10/1978 | Fed. Rep. of Germany ... 248/281.1 |
| 2819976 | 11/1979 | Fed. Rep. of Germany . |
| 2042623 | 9/1980 | United Kingdom ................ 248/284 |

Primary Examiner—Alvin C. Chin-Shue
Attorney, Agent, or Firm—Andrew Wilford; Herbert Dubno

[57] ABSTRACT

A holder for supporting a piece of equipment above a surface has a column fixed to the surface, projecting upward therefrom, and having an upper end defining an inner horizontal pivot axis, an inner arm having an inner end pivoted at the inner axis on the column and an outer end defining an outer horizontal pivot axis, and an outer arm having an inner end pivoted at the outer axis on the inner-arm outer end and an outer end provided with a support for the piece of equipment. A link has an inner end seated in the upper end of the column at a location spaced a predetermined relatively long distance from the inner axis and an outer end seated in the inner end of the outer arm at a location space a predetermined relatively short distance from the outer axis. Thus as the inner axis is lifted the angle formed between the support and the horizontal increases.

6 Claims, 2 Drawing Sheets

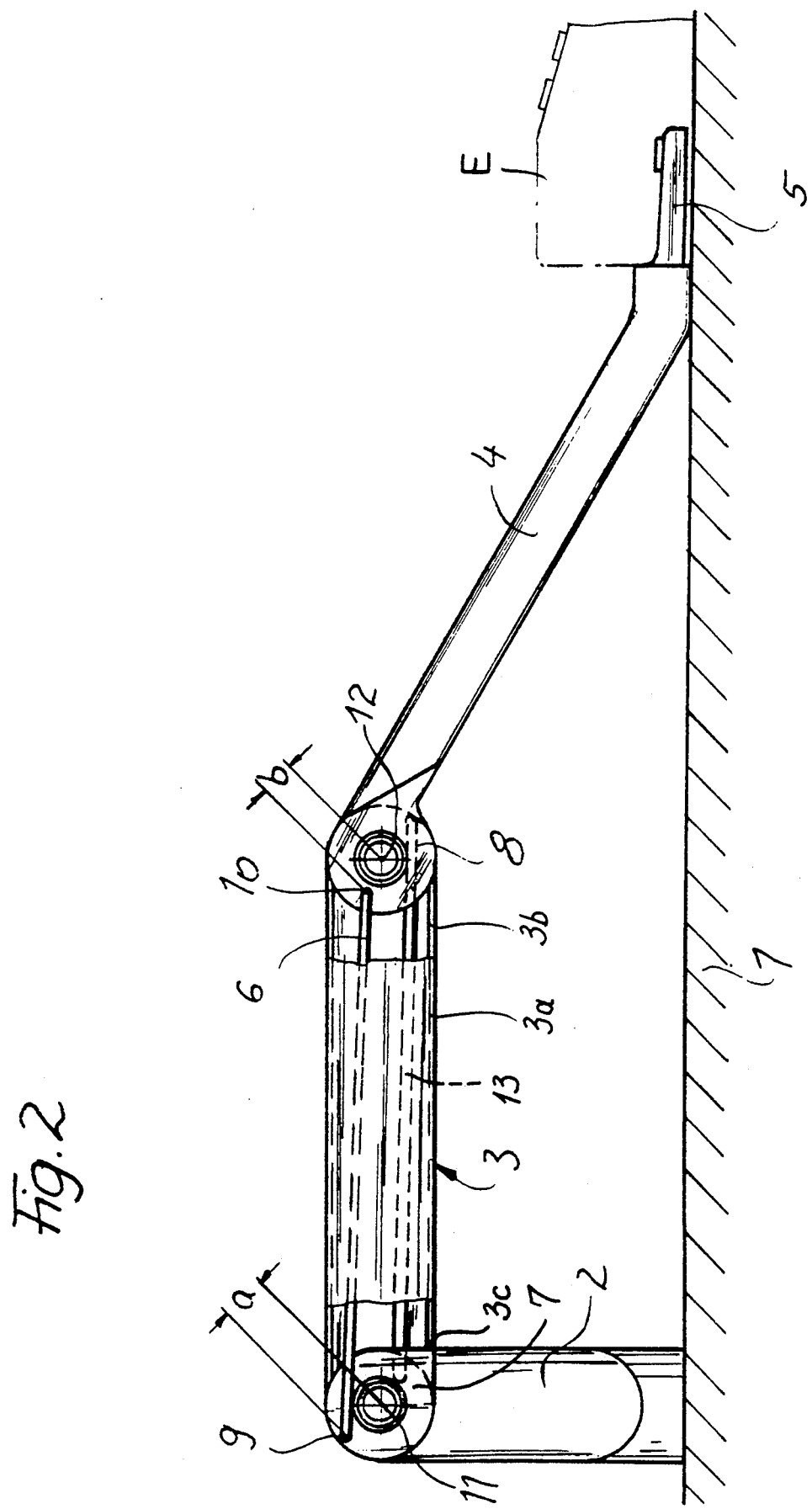

HOLDER FOR OFFICE EQUIPMENT

FIELD OF THE INVENTION

The present invention relates to a holder for a telephone, adding machine, keyboard, or similar piece of office equipment. More particularly this invention concerns an articulated-arm assembly for supporting a piece of equipment which must be viewed and/or used in different positions.

BACKGROUND OF THE INVENTION

It is known to mount a piece of office equipment on an articulated-arm holder which allows the equipment to be moved about above the work surface while it is solidly supported so that it can be used. A telephone, adding machine, or keyboard, for instance, is frequently pulled over to the user when it is going to be used heavily, but is pushed back when subjected to lighter use.

A standard such device as described in German patent 2,819,976 has a stationary column that projects upward from the anchor surface and that can even pivot thereon about its upright longitudinal axis. An inner arm has an inner end pivoted about an inner horizontal axis on the upper end of this column and has an outer end. In turn an outer arm has an inner end pivoted at an outer horizontal axis on the inner-arm outer end and an outer end provided with some form of support on which the piece of equipment in question is held or rests. A nonextensible link has an inner end pivoted on the column offset from the inner pivot axis and an outer end pivoted on the inner end of the outer arm offset from the outer axis. This link extends parallel to a longitudinal axis of the inner arm, that is parallel to a plane through the two support axes so as to form with the inner arm a parallelogrammatic linkage.

As a result the equipment support plate always lies at the sam angle relative to the horizontal. This position is normally flat, that is with the equipment in its normal horizontal orientation. When, however, the equipment has been pushed back, with the inner and outer arms both generally vertical, this horizontal orientation makes the equipment difficult to use. For example, when an adding machine is pushed back toward the rear of the desk it is difficult to see its display without tipping it up.

OBJECTS OF THE INVENTION

It is therefore an object of the present invention to provide an improved articulated equipment holder.

Another object is the provision of such an improved articulated equipment holder which overcomes the above-given disadvantages, that is which orients the equipment optimally depending on position.

SUMMARY OF THE INVENTION

A holder for supporting a piece of equipment above a surface according to this invention has a column fixed to the surface, projecting upward therefrom, and having an upper end defining an inner horizontal pivot axis, an inner arm having an inner end pivoted at the inner axis on the column and an outer end defining an outer horizontal pivot axis, and an outer arm having an inner end pivoted at the outer axis on the inner-arm outer end and an outer end provided with a support for the piece of equipment. A link has an inner end seated in the upper end of the column at a location spaced a predetermined relatively long distance from the inner axis and an outer end seated in the inner end of the outer arm at a location spaced a predetermined relatively short distance from the outer axis. Thus as the inner axis is lifted the angle formed between the support and the horizontal increases.

With this system, therefore, the equipment being held on the support will be reoriented when it is pushed back. It will be flat when extended but tipped up when pushed back for easiest use. Such an arrangement is extremely useful for something having a keypad, keyboard, and/or display.

According to another feature of this invention a second such link separate from but parallel to the first-mentioned link is seated in the column and outer arm at second locations spaced like the first-mentioned locations differently from the respective axes. This considerably stabilizes and strengthens the assembly, as both links can be set to withstand tension predominantly.

Furthermore according to the invention the arms are movable between an extended end position with the axes spaced horizontally relatively far apart and a pushed-back end position with the axes spaced horizontally relatively closely. The support for the equipment is generally horizontal in the extended position and oblique to the horizontal in the pushed-back position. In addition the arms and column have abutments that meet in the end positions and in the pushed-back position the inner arm is upright and aligned with the column and in the extended position the inner arm is generally horizontal.

DESCRIPTION OF THE DRAWING

The above and other objects, features, and advantages will become more readily apparent from the following, reference being made to the accompanying drawing in which:

FIG. 2 is a view like FIG. 1 but showing the equipment in the fully extended position.

SPECIFIC DESCRIPTION

Figure 1:
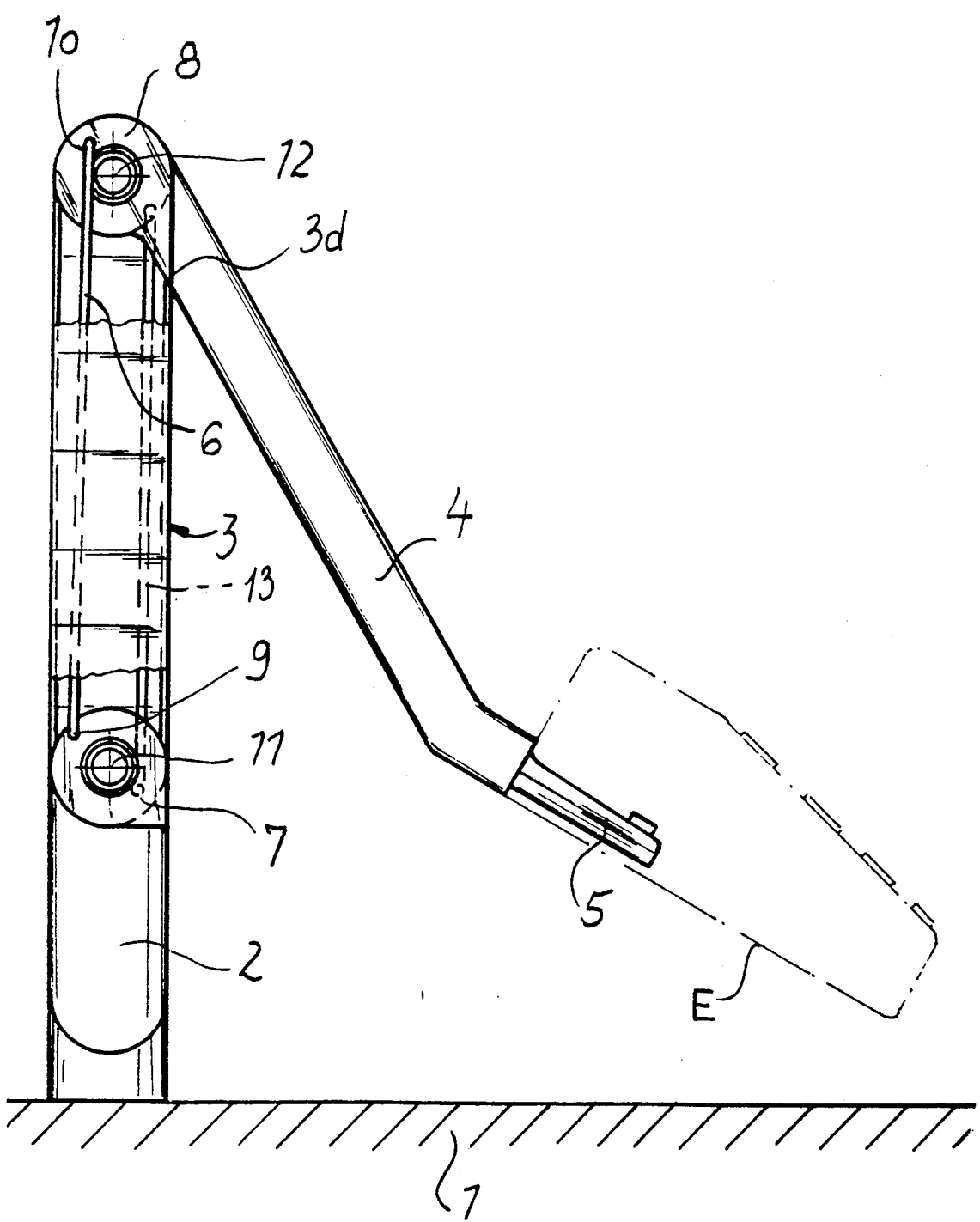
FIG. 1 is partly sectional side view showing the holder in the pushed-back position.

As seen in FIGS. 1 and 2 a holder for a piece of equipment E according to this invention has a rigid upright column 2 projecting upward from and fixed in a support surface 1, for instance a desk. An inner arm 3 has an inner end pivoted on the top of the column 2 about an inner horizontal axis 11 and an outer end defining a horizontal axis 12 on which is pivoted an inner end of an outer arm 4 provided at its outer end with a support panel or plate 5 on which the piece of equipment E rests.

The upper end of the column 2 is formed as a disk 7 and the inner end of the arm 4 as a similar disk 8, both extending perpendicular to the respective axes 11 and 12. The arm 3 is also formed of a pair of identical housing halves 3a and 3b joined along a vertical plane perpendicular to the axes 11 and 12, the housing half 3a being shown broken away in FIGS. 1 and 2 at its opposite longitudinal ends.

According to the invention a link 6 has bent-over inner end 9 seated in the disk 7 at a location offset by a distance a from the axis 11 and a bent-over outer end 10 seated in the disk 8 at a location offset by a distance b from the axis 12. The distance a is greater than the distance b and the link 6 has a length between its ends substantially equal to the distance between the axes 11 and 12 so that it lies at no time parallel to a straight line drawn between these axes 11 and 12. Another such link 13 parallel to the link 6 can be provided on the other side of the arm 3 similarly seated in locations spaced by the distances a and b from the axes 11 and 12 The pivots at the axes 11 and 12 can be formed by gudgeon pins projecting from the column 2 and arm 3 and received in complementary holes in the arm 3 and arm 4, respectively.

Thus, unlike a parallelogrammatic linkage, the trapezium linkage according to this invention will change the angular orientation of the outer arm 4 relative to the horizontal as the arm 3 is pivoted up. The table 5 will be generally horizontal in the extended position of the holder as seen in FIG. 2, but will be angled to the horizontal in the pushed-back position of FIG. 1. In the extended position the arm 3 and column 2 abut at 3c and in the pushed back position the arms 3 and 4 abut at 3d to limit further movement.

As a result a keyboard, telephone, or the like will be flat and horizontal when it is pulled out and is right under the user's nose. When, however, it is pushed back it will be angled up so that it can still be easily used, without the user having to crane his or her neck or stand up.

We claim:

1. A holder for supporting a piece of equipment above a surface, the holder comprising:
   a column fixed to the surface, projecting upward therefrom, and having an upper end defining an inner horizontal pivot axis;
   an inner arm having an inner end pivoted at the inner axis on the column and an outer ned defining an outer horizontal pivot axis;
   an outer arm having an inner end pivoted at the outer axis on the inner-arm outer end and an outer end provided with a support for the piece of equipment, the support having a longitudinal axis; and
   a rigid and straight link having an inner end pivoted in the upper end of the column at a location spaced and fixed a predetermined long distance from the inner axis and an outer end pivoted in the inner end of the outer arm at a location spaced and fixed a predetermined short distance smaller than the long distance from the outer axis, whereby as the inner arm if pivoted the angle formed between the longitudinal axis of the support and the horizontal changes.

2. The holder defined in claim 1, further comprising a second such link separate from but parallel to the first-mentioned link and seated in the column and outer arm at second locations spaced like the first-mentioned locations differently from the respective axes.

3. The holder defined in claim 1 wherein the arms are movable between an extended end position with the axes spaced horizontally relatively far apart and a pushed-back end position with the axes spaced horizontally relatively closely.

4. The holder defined in claim 3 wherein the support for the equipment is generally horizontal in the extended position and oblique to the horizontal in the pushed-back position.

5. The holder defined in claim 3 wherein the arms and column have abutments that meet in the end positions.

6. The holder defined in claim 3 wherein in the pushed-back position the inner arm is upright and aligned with the column and in the extended position the inner arm is generally horizontal.

* * * * *